United States Patent [19]

Ananthapadmanabhan et al.

[11] Patent Number: 4,897,199

[45] Date of Patent: Jan. 30, 1990

[54] ENVIRONMENTALLY SAFE METHOD FOR THE REMOVAL OF RESIDUAL WATER SOLUBLE POLYMERS FROM AQUEOUS WASTE STREAMS

[75] Inventors: Kavssery P. Ananthapadmanabhan, New Windsor, N.Y.; Errol D. Goddard, Haworth, N.J.

[73] Assignee: Union Carbide Chemicals and Plastics Company Inc., Danbury, Conn.

[21] Appl. No.: 375,488

[22] Filed: Jul. 5, 1989

[51] Int. Cl.$^4$ ................................................ C02F 1/28
[52] U.S. Cl. .................................. 210/639; 210/651; 210/663; 210/670; 210/691
[58] Field of Search ............... 210/638, 639, 650, 651, 210/670, 691, 908, 663

[56] References Cited

U.S. PATENT DOCUMENTS 4,549,966 10/1985 Beall .................................... 210/691

*Primary Examiner*—Ivars Cintins
*Attorney, Agent, or Firm*—Henry H. Gibson

[57] ABSTRACT

An environmentally safe method is provided for the removal and disposal of residual water soluble polymers, particularly polyethers, from aqueous waste streams, wherein a pretreated inert inorganic substrate is contacted with the waste stream and the polymer contained therein adsorbed onto the substrate. Thereafter, the polymers are removed from the substrate as $CO_2$ and water by combustion and the substrate subjected to regenerative conditions for recycling.

16 Claims, No Drawings

ENVIRONMENTALLY SAFE METHOD FOR THE REMOVAL OF RESIDUAL WATER SOLUBLE POLYMERS FROM AQUEOUS WASTE STREAMS

BACKGROUND OF THE INVENTION

1. Field of the Invention

This invention relates in general to the removal of residual polyethers from aqueous waste streams so that such streams can be disposed of in an environmentally safe manner. In another aspect, this invention is directed to the removal of polyethers from aqueous waste streams by adsorbance of the polyethers on an inert substrate and destruction of the residual polyethers by combustion. In a further aspect, this invention relates to a process wherein the inert substrate can be regenerated and recycled for further use.

2. Description of the Prior Art

Alkylene ether polymers are not considered to be particularly hazardous and accordingly, their removal from aqueous solutions has not received much attention in the past. However, it appears from commercial and industrial operations which use such polymers, as well as due to the ever changing regulations of the Environmental Protection Agency, that the removal of such materials from aqueous solutions is becoming a problem of increasing importance. While the removal of polyethers which are present in aqueous solutions in relatively high concentrations can be accomplished economically by well known methods, the removal of trace amounts from waste streams to comply with environmental regulations presents an additional problem. The processing of large volumes of liquid waste streams to remove only minor amounts of polyether can be expensive and time consuming.

Prior to the present invention, a variety of techniques were available for the separation of alkylene ether polymers from aqeuous solutions include cloud point precipitation, chemical precipitation, ultrafiltration, adsorption on solids, biodegradation, and the like. Depending upon the concentration of the polyether in solution, different techniques or a combination of techniques may be necessary to remove the polymer. For example, in the high concentration range (5–10%), cloud point precipitation may be effective to reduce the polymer to a fraction of a percent. Adsorption, on the other hand, may be effective in the low concentration range to reduce the polyether to ppm levels. Chemical precipitation involves the introduction of another reagent and hence, the effect of residual amounts of the additive in the waste stream should be considered.

Ultrafiltration is becoming a widely accepted technique for the separation of macromolecules and ultra-fine solids. Membrane fouling, low filtration rate, and the like are among the problems involved in U.F. In biodegradation, the fate of the microorganism and of the degraded produce should be considered. In short, all the techniques have definite advantages, but associated limitations. Yet another factor to take into consideration while selecting a particular technique is the subsequent disposal/separation/regeneration problem.

Accordingly, one or more of the following objects will be achieved by the practice of the present invention. It is an object of this invention to provide a method for the removal of residual polyethers from aqueous waste streams in an environmentally safe manner. Another object of this invention is to provide a method for the removal of polyethers from waste streams wherein essentially all of the polyether is adsorbed from the waste stream in one operation. A further object of the present invention is to provide a method wherein residual polyethers are adsorbed on an inert substrate. Another object is to provide a method wherein the adsorbed polyethers are removed from the substrate as carbon dioxide and water. A still further object is to provide a process for regenerating and recycling the substrate for use in further adsorption of polyethers. Another object is to provide a continuous process for removing residual polyethers from aqueous waste streams wherein the adsorbent is regenerated and recycled in an environmentally safe manner. These, and other, objects will readily become apparent to those skilled in the art in light of the teachings herein set forth.

SUMMARY OF THE INVENTION

In its broad aspect, the present invention is directed to an environmentally safe method for the removal and disposal of residual water soluble polymers, particularly polyethers, from waste streams wherein the polymers have a molecular weight of greater than about 200 and are present in the waste stream in a concentration preferably less than about 1 percent. The method of the present invention comprises the steps of:

(a) pretreating a bentonite adsorbent having a surface area of from about 500 to about 1000 square meters per gram, by heating at a temperature of from about 650° C. to about 750° C.; preferably for from 1 to 4 hours;

(b) contacting the waste stream with the bentonite adsorbent for a period of time of from about 1 to about 10 minutes;

(c) separating a waste stream essentially free of the polyethers from the bentonite adsorbent;

(d) heating the bentonite adsorbent to a temperature of from about 650° C. to about 750° C. for a period of time sufficient to convert the polyethers to carbon dioxide and water;

(e) treating the bentonite adsorbent after heating with at least one acid, alkali or neutral wash for a period of at least one hour to restore the interlayer spacing of the bentonite to at least about 9 to about 10 angstroms as determined by X-ray diffraction analysis; and (f) recycling the bentonite adsorbent for contact with additional aqueous waste stream containing polyethers.

DETAILED DESCRIPTION OF THE INVENTION

In accordance with the above sequence of steps, the method of the present invention provides an environmentally safe means for the removal and disposal of polyethers from aqueous waste streams. Disposal of the waste stream can then be made without fear of creating environmentally unsafe conditions.

As indicated above, the method of the present invention utilizes a bentonite adsorbent for removal of polyethers from aqueous waste streams. Other adsorbents were investigated for the removal of polyethers, but were found to be deficient in one or more aspects. For instance, a variety of solids were evaluated including adsorbents such as alumina, silica, apatite (Ca-phosphate), bentonite clay, kaolin clay, filter paper, cellulose powder and Amberlite IRC-50 (methacrylic acid beads).

The method of the present invention is particularly useful for the removal of polyethers from aqueous waste streams where the concentration of polyether is preferably less than about 1 weight percent, and more preferably, about 0.5 weight percent. Concentrations greater than 1 percent can also be removed, but may require the use of larger amounts of absorbent an/or repeated recycling of the aqeuous waste stream.

A typical adsorption test was conducted as follows. 20 cc of a polyether solution sold by Union Carbide Corporation under the trademark UCON Fluid 75 H 380,000 and of known concentration and pH was contacted with 0.5 g (solids concentration =25 gpl) of solid in a glass vial. The initial pH of the suspension was noted. The vial was shaken using a wrist action shaker for 1 hour. The final pH of the slurry was noted. The solid was then separated from the supernatant by centrifugation at 10,000 rpm. The final concentration of the polyether fluid in the supernatant was determined using a total carbon analyzer. The amount of polyether fluid depleted from solution was used to calculate the adsorption density (mg of polymer per gram of the solid).

The total carbon analysis was done using a Beckman Tocamaster. This technique has been found to be extremely effective to detect the polyether down to about one ppm. Fresh calibration curves were generated for each series of experiments. Also, control experiments in which the solution conditions were identical to an adsorption system but without any solid/UCON Fluid were also conducted to ensure the absence of $CO_2$/organic carbon release/uptake by various system components.

The adsorption behavior of the polyethers from an aqueous solution containing 200 ppm of the polymer onto solids such as alumina, silica, apatite, bentonite, kaolin, filter paper, cellulose powder and Amberlite-IRC-50 was determined. The results obtained clearly showed the unexpected and surprising superior adsorption properties of bentonite. Amberlite and kaolin clay were also found to adsorb the polyether, but to a much lesser extent. GPC analysis of the supernatant also confirmed the above results.

The concentration of the polyether remaining in solution after contacting the bentonite with different levels of polyether solutions was measured. It was determined that up to a level of about 1% polyether, almost all of the polymer is extracted by the adsorbent. At higher levels, however, the percentage remaining in solution is found to increase sharply. The corresponding adsorption density values given in Table 1 below can be seen to remain almost constant above about 1% initial UCON in solution. UCON is a trademark of the Union Carbide Corporation.

TABLE 1

UCON 75 H 380,000 ADSORPTION
SOLID: Bentonite (25 g/l)
pH: 4

| UCON Concentration | | | |
|---|---|---|---|
| Initial ppm | Final ppm | Adsorption mg/g | % Removed |
| 5,000 | 60 | 198 | 98.8 |
| 10,000 | 305 | 386 | 96.4 |
| 30,000 | 22,000 | 320 | 36.4 |
| 100,000 | 92,500 | 300 | 7.5 |

It was also noted that the saturation adsorption density of the polyether on bentonite is about 325–400 mg per gram of the solid. Evidently, bentonite adsorbs about one third its own weight of the polymer from solution.

The results presented above in Table 1 were all for tests conducted at pH 4. Since the working pH of most of the polyether systems, such as the metal working fluid and the hydrolubes, is in the alkaline range, the adsorption behavior of the polyether fluids in the high pH range was also determined. The saturation adsorption of UCON 75 H 380,000 polyether on bentonite at pH 8.9–9.0 is about 225–275 mg/g, as shown in Table 2 below. The system, therefore, exhibits only weak pH dependence, and this is desirable since it makes possible the treatment of these practical systems without any acidification.

TABLE 2

UCON 75 H 380,000 ADSORPTION
EFFECT OF pH
SOLID: Bentonite (25 g/l)

| UCON Concentration | Adsorption, mg/g | |
|---|---|---|
| Initial % | pH 4 | pH 8.9 |
| 0.1 | 39 | 36 |
| 0.5 | 198 | 194 |
| 1.0 | 386 | 276 |
| 3.0 | 320 | 220 |
| 10.0 | 300 | 240 |

As mentioned above, the reason for the sharp increase in the concentration of polyether fluid remaining in solution above about 1% initial level is believed to be the saturation of the bentonite. In such a case, increasing the solids concentration should result in complete extraction of the polyether fluid, even at higher levels. This was confirmed by contacting a 3% polyether solution with different amounts of bentonite. The results are given in Table 3 below.

TABLE 3

UCON 75 H 380,000 ADSORPTION
EFFECT OF SOLIDS CONCENTRATION
SYSTEM: UCON 3%
Bentonite
pH = 8.9

| Bentonite Concentration g/l | Adsorption mg/g | % Removed |
|---|---|---|
| 25 | 220 | 18.3 |
| 50 | 260 | 43.3 |
| 75 | 240 | 60 |
| 100 | 275 | 80.4 |

An increase in the bentonite concentration from 25 g/l to 100 g/l resulted in an increase in the percent of the UCON fluid removed from about 18 to 80%. Thus, it appears that it is possible to scale up the extraction for higher levels of UCON fluid by using appropriately higher amounts of the solid.

In addition to UCON polymers and similar polyethers, typical waste streams are likely to contain surfactants, inorganic ions and even organic complexing agents. The presence of such unavoidable species can be expected to have definite influence on the polymer adsorption. Tests to determine the effect of NaCl, $CaCl_2$ and triethanolamine (TEA) were conducted. While NaCl caused a measurable increase in the adsorption, $CaCl_2$ caused a decrease to about 100 mg/g. The results of the test are set forth below in Table 4.

TABLE 4

UCON 75 H 380,000 ADSORPTION
EFFECT OF SALTS
SOLID: Bentonite (25 g/l)
pH: 8.9

| UCON Concentration % | Adsorption, mg/g | | |
|---|---|---|---|
| | Water | 0.5% NaCl | 0.5% CaCl$_2$ |
| 0.1 | 36 | 39 | 39.8 |
| 0.5 | 194 | 199 | 200 |
| 1.0 | 276 | 272 | 258 |
| 3.0 | 220 | 348 | 140 |
| 10.0 | 240 | 320 | 100 |

TEA under alkaline pH conditions was found not to adsorb significantly on bentonite and did not affect the adsorption of the polyether fluid markedly. At pH 4, however, TEA was found to adsorb strongly on bentonite and was found to compete with the polymer for adsorption sites. Other ethanolamines are also likely to adsorb bentonite in a similar manner. This effect of TEA is particularly important since many polyether fluid formulations of interest contain significant amounts of TEA and the, natural pH of the system is in the alkaline range.

The method of the present invention is applicable to a wide variety of water-soluble polymer, including polyethers. Included among the polyethers are the polyalkylene oxides. These materials are polymers of ethylene oxide or copolymers of ethylene oxide and propylene oxide, with molecular weights ranging from about 200 and above. They find numerous uses as lubricants, hydraulic fluids, metal working fluids, etc. and, thus, are quite representative of the water-soluble polyethers typically encountered in waste-water streams.

Typical polyethers selected to determine the effectiveness of the present invention were UCON 75 H 380,000 (Avg. Mo. Wt. 18,000) and UCON 50 HB 660 (Avg. Mol. Wt. 1700), sold by the Union Carbide Corporation.

The molecular weight of UCON 75 H 380,000 is about 18,000. Tests were conducted to determine the adsorption behavior of lower molecular weight polyethers. UCON 50 HB 660, which has a molecular weight of about 1,000, was found to adsorb with a saturation capacity of about 240-300 mg/g, as set forth in Table 5 below.

TABLE 5

UCON 50 HB 660 ADSORPTION
SYSTEM: Bentonite (25 g/l)

| UCON Fluid Concentration % | Adsorption, mg/g | | % Removed | |
|---|---|---|---|---|
| | pH 4 | pH 9 | pH 4 | pH 9 |
| 0.1 | 35.2 | 36 | 88 | 90 |
| 0.2 | 73.6 | 74 | 92 | 93 |
| 0.5 | 194.4 | 193 | 97 | 96 |
| 1.0 | 238 | 236 | 60 | 59 |
| 3.0 | 280 | 240 | 23 | 20 |
| 10.0 | | 240 | | 6 |

In contrast to this, polyethers with molecular weight less than 300 did not exhibit such high adsorption capacity. For example, ethylene glycol and diethylene glycol did not adsorb on bentonite as noted in Table 6 below. At 0.3% level, about 25% (30 mg/g) of polyethylene glycol PEG 200 (Mol. Wt. 200) and 70% (84 mg/g) of UCON 50 HB 55 were extracted by bentonite. Note that at the same level, almost 98–99% (117–118 mg/g) of UCON 75 H 380,000 is extracted by bentonite. It appears that the critical molecular weight above which adsorption is independent of molecular weight is in the range of 300 to 1000.

TABLE 6

ADSORPTION OF ETHYLENE GLYCOL, DIETHYLENE
GLYCOL, AND POLYETHYLENE GLYCOL (PEG) 200
ON BENTONITE
Bentonite: 25 gpl
pH: Natural ~ 8.9

| Polymer | Initial Concentration % | % Adsorption |
|---|---|---|
| EG | 0.1 | 0 |
| | 0.3 | 0 |
| DEG | 0.1 | 0 |
| | 0.3 | 6.4 |
| PEG 200 | 0.1 | 7.6 |
| | 0.3 | 25.2 |
| 50 HB 55 (MW 270) | 0.1 | 63.2 |
| | 0.3 | 70.1 |

Without intending to be bound to any particular theory, a comparison of the adsorption results of PEG 200 and 50 HB 55 suggests that the higher the hydrophobic character of the molecule, the higher the adsorption. A possible reason for this is the reduced tolerance of water for hydrophobic molecules, rather than any specific hydrophobic interaction between the adsorbate and the adsorbent.

Tests discussed so far were conducted by vigorously shaking the UCON solution with a dispersed clay suspension for one hour. In order to explore the kinetics of adsorption, the following experiment was done. The clay-UCON fluid solution was vigorously shaken by hand for one minute. The suspension was then left undisturbed for an hour.

The results obtained are set forth in Table 7 below, and show that the adsorption values obtained by the later technique were identical to those obtained by the wrist-action shaker method. These results suggest that the kinetics of adsorption were extremely fast, and possibly that the adsorption takes place within a minute.

TABLE 7

UCON 75 H 380,000 ADSORPTION
EFFECT OF MOD OF STIRRING
Bentonite (50 g/l)
pH: 8.9

| UCON Fluid Concentration % | Adsorption, mg/g | |
|---|---|---|
| | Wrist-Action Shaker, 1 Hr. | 1 Min. Hand Shake 1 Hr. Contact |
| 0.1 | 18.4 | 18.9 |
| 0.2 | 38.4 | 38.9 |
| 0.5 | 98.3 | 98.7 |
| 1.0 | 198.3 | 198.5 |
| 3.0 | 260 | 240 |

As noted above, the present invention provides an environmentally safe method for disposal of the polyethers which have been removed from the aqueous waste streams. Since the polyethers, when burned, convert to, carbon dioxide and water, the possibility of burning off the polyether polymer at high temperature and regenerating the bentonite was examined. It was found that burning the polymer at about 650° C. for about four hours, followed by appropriate acid/neutral-/alkali wash, not only removes the polyether in a safe manner, but also restores the adsorption properties of bentonite completely. In fact, controlled experiments show that burning the bentonite increases the adsorption capacity of even the as-received bentonite. The lower adsorption capacity of the as-received bentonite can probably be attributed to the presence of certain preadsorbed organic material on it. In any case, firing the clay at about 650° C. provides a viable technique to regenerate the clay, as well as to improve the adsorption capacity of the as-received clay. It was also noted that samples fired at 1000° C. lost their adsorption properties totally. Without intending to be bound by any particular theory, this effect may be attributed to the structural transformation of bentonite at about 750° C. Hence, from an energy efficiency point of view, it is desirable to burn off the polymer at the lowest possible temperature, consistent with generating/regenerating the adsorption capacity of the clay.

The following Tables 8-10 set forth the data on bentonite recycling,

TABLE 8

BENTONITE RECYCLING
SYSTEM: UCON 75 380,000 (1000 ppm)
pH: 8.9
FIRING TEMP: 605° C.

| Bentonite Treatment | Adsorption mg/g | % UCON Polymer Removed |
|---|---|---|
| As Received | 38.4 | 96 |
| Recycled — Fired & Acid Washed | 38. | 96.5 |
| Recycled — Fired & Base Washed | 38 | 95 |
| Control — Fired & Acid Washed | 40 | 99.9 |
| Control — Fired & Base Washed | 39.6 | 99 |

TABLE 9

BENTONITE RECYCLING
SYSTEM: UCON 75 380,000 (1%)
pH: 3.9
FIRING TEMP: 605° C.

| Bentonite Treatment | Saturation Adsorption mg/g | % Removed |
|---|---|---|
| As Received | 276 | 69 |
| Recycled — Fired & Hydrated in H$_2$O - 120h. | 396.6 | 99 |
| Control — Fired & Hydrated in H$_2$O - 120h. | 396.8 | 99 |

TABLE 10

BENTONITE RECYCLING
SYSTEM: 75 380,000 (1000 ppm)
pH: 3.9
FIRING TEMP: 1000° C.

| Bentonite Treatment | Adsorption mg/g | % Removed |
|---|---|---|
| As received | 38.4 | 96 |
| Recycled | 1.4 | 3.5 |
| Control-Fired | 2.6 | 6.5 |

In all the tests conducted, the separation of the polyether polymer covered-bentonite from the supernatant solution was done by high-speed centrifugation. The fine size, as well a the slow settling characteristics, of the bentonite suspension make it difficult to use conventional filtration/centrifugation techniques for solid-liquid separation. Apart from high speed centrifugation, other techniques which can be used include ultrafiltration and flocculation-filtration. The latter involves the use of reagents such as alum or high molecular weight Polyox. ® Utrafiltration, on the other hand, has certain distinct advantages. In this technique, it is possible to integrate both the adsorption and the solid-liquid separation into a single step operation. Tests using an Amicon thin channel cross-flow ultrafiltration unit show that by contacting the polyether fluid with bentonite suspension inside the UF chamber, both adsorption and solid-liquid separation can be accomplished in a single step. A possible flow sheet to remove polyether fluids based upon this integrated process is shown in FIG. 2.

A useful variation of the above technique is the use of membrane bags containing bentonite which, when suspended in polyether solutions, extract the polymer from solution. The success of this technique depends upon the kinetics of diffusion of the polymer through the membrane.

In an attempt to understand the molecular mechanisms involved in the uptake of polyether fluids by bentonite, the polymer covered samples were subjected to X-ray diffraction analysis. The diffraction pattern for the untreated dry clay showed a peak corresponding to 9.7$^A$ interlayer spacing. Upon polyether adsorption, a very sharp peak at a much lower angle, corresponding to about 18.2-18.3$^A$, spacing was found to develop in these samples. The increase in the interlayer spacing by 8.5-8.6$^A$ is about twice the diameter of the polyether chain, suggesting that two layers of polymer lie flat in between the clay platelets. Firing the clay at 650° C. to burn off the polymer resulted in a reduction in interlayer spacing to values corresponding to the original clay However, it was also noted that the samples fired at 1000° C. did not show a 9.7$^A$ interlayer spacing, but only a 4 $^A$ spacing This collapse of the original clay structure is evidently responsible for the low adsorption properties of the bentonite if the combustion temperature used to remove the polyether are too high. The X-ray diffraction results are shown in Table 11 below.

TABLE 11

| X-RAY DIFFRACTION RESULTS | |
|---|---|
| Bentonite Treatment | d-spacing Å |
| Fired at 650° C. | 9.7 |
| 1% UCON 75 H 380K | 18.2 |
| 1% UCON 50 HB 660 | 18.3 |
| As Received | 12.3 |

Although the invention has been illustrated by the preceding examples, it is not to be construed as being limited to the materials disclosed therein, but rather, the invention is directed to the generic art as hereinbefore disclosed. Various modifications and embodiments thereof can be made without departing from the spirit or scope thereof.

What is claimed is:

1. An environmentally safe method for the removal and disposal of residual water soluble polymers from aqueous waste streams, wherein said polymers have a molecular weight of greater than about 200 and are present in said aqueous waste stream in a concentration of less than about 1 percent, said method comprising the steps of:
 (a) pretreating a bentonite adsorbent having a surface area of from about 500 to about 1000 square meters per gram by heating at a temperature of from about 650° C. to about 750° C.;

(b) contacting said aqueous waste stream with said bentonite adsorbent for a period of time of from about 1 to about 10 minutes;

(c) separating an aqueous waste stream essentially free of said polymers from said bentonite adsorbent;

(d) heating said bentonite adsorbent to a temperature of from about 650° C. to about 750° C. for a period of time sufficient to convert said polymers to carbon dioxide and water;

(e) treating said bentonite adsorbent after heating with at least one acid, alkali or neutral wash for a period of at least one hour to restore the interlayer spacing of said bentonite to at least about 10 angstroms, as determined by X-ray diffraction analysis; and (f) contacting said bentonite adsorbent from step (e) with an additional water soluble polymer containing aqueous waste stream.

2. The method of claim 1, wherein the contacting is done under agitation.

3. The method of claim 2, wherein the duration of agitation is about 1 to 2 minutes.

4. The method of claim 1, wherein the adsorbent is contained in a porous membrane.

5. The method of claim 1, wherein the polymer is a polyether.

6. The method of claim 5, wherein the concentration of the polyether is less than about 5% by weight of the aqueous waste stream.

7. The method of claim 5, wherein the molecular weight of the polyether is greater than about 1,000.

8. The method of claim 5, wherein the polyether is a poly(oxyalkylene) ether.

9. The method of claim 5, wherein the polyether is a polymer of ethylene oxide.

10. The method of claim 5, wherein the polyether is a copolymer of ethylene oxide and propylene oxide.

11. The method of claim 1, wherein the adsorbent is separated from the aqueous waste stream by ultrafiltration.

12. The method of claim 1, wherein the adsorbent is heated at a temperature of about 650° C. to about 750° C. for a period of from about 1 to about 4 hours during step (a).

13. The method of pretreating the adsorbent of claim 1, comprising contacting the adsorbent with at least one acid.

14. The method of claim 13, wherein the acid is hydrochloric acid.

15. The method of pretreating the adsorbent of claim 1, comprising contacting the adsorbent with at least one base.

16. The method of claim 15, wherein the base is sodium hydroxide.

* * * * *